C. E., J. & S. Wethered,
Steam-Boiler Superheater.
No. 1,595. Reissued Dec. 22, 1863.
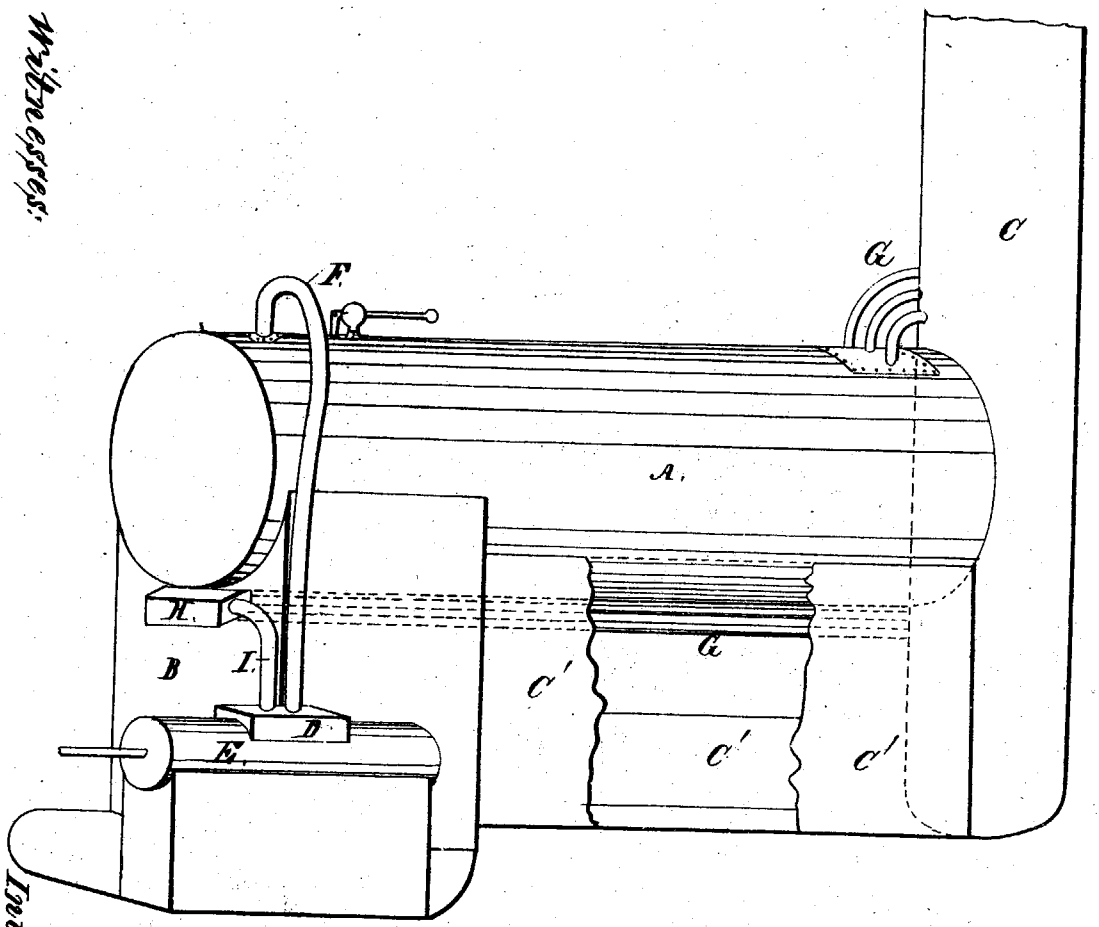
Witnesses:
W. M. Hayward
Samuel Reese
Inventors:
Chas. E. Wethered
Jno. Wethered
Saml. Wethered
THE ECKERT LITHOGRAPHING CO., WASHINGTON, D. C.

UNITED STATES PATENT OFFICE.

CHARLES E. WETHERED, JOHN WETHERED, AND SAMUEL WETHERED, OF BALTIMORE, MARYLAND.

IMPROVEMENT IN THE USE OF STEAM FOR ACTUATING ENGINES.

Specification forming part of Letters Patent No. 10,054, dated September 27, 1853; antedated May 5, 1853; Reissue No. 1,595, dated December 22, 1863.

*To all whom it may concern:*

Be it known that we, CHARLES E. WETHERED, JOHN WETHERED, and SAMUEL WETHERED, of Baltimore, in the State of Maryland, have invented certain new and useful Improvements in Superheating Steam and in the Application of Steam to Steam-Engines; and we do hereby declare that the following is a full, clear, and exact description thereof, reference being had to the accompanying drawing, making part of this specification, which gives a representation in perspective with a part of the wall of the furnace-flue removed.

It is well known that if the temperature of steam is increased by the application of heat to steam after it has been generated its elastic force will be only increased in about the same ratio as if applied to atmospheric air or any other permanent gas.

It is also well known that a given amount of heat applied to water to generate steam will produce a much greater amount of power than if applied to superheat and expand saturated steam; and it is also well known that "saturated steam," as it is termed—that is, steam generated from a bulk of water in a steam-boiler—when drawn from such boiler for use, contains particles of water not evaporated, which are carried up into the steam-chamber of the boiler and thence into the steam-pipe and engine by the force of the current of steam, the presence of such particles of water being a source of inconvenience and a waste of fuel.

The object of our invention is to avoid such inconvenience and such waste of fuel, and to this end our said invention consists, first, in combining superheated steam with saturated steam in actuating steam-engines, whereby the particles of water contained in the saturated steam are evaporated by the surplus heat of the superheated steam, and the elastic force of the whole thereby increased; second, in connecting the steam-chamber of the boiler with the engine by two or more pipes—one for conveying the superheated steam and the other the saturated steam—whether the said pipes separately discharge into the cylinder of the engine, or into a common receptacle connected with the cylinder of the engine, or discharge the one into the other before reaching the cylinder.

In the accompanying drawings, A represents an ordinary cylindrical steam-boiler, with the usual furnace at B, connected with the smoke-stack C by a flue, C′, constructed of masonry, extending along under the boiler. Steam is taken from the upper part of the boiler by pipes G, which pass into and down through the smoke-stack, and along inside the horizontal flue C′, and through the upper part of the fire-chamber B to a box, H, outside of the fire-chamber, into which the steam is discharged after having been superheated by the heat in the smoke-stack, flue, and furnace. The superheated steam box H is connected by a pipe, I, with the steam-chest D of an engine, E, and the said steam-chest D of the engine is also directly connected with the steam-chamber of the boiler by pipe F, so that saturated steam is supplied to the steam-chest D directly from the boiler, and is there mingled with the steam which has been superheated by passing through the pipes G, exposed to the heated products of combustion in the flue-space of the boiler. From the steam-chest D the combined saturated and superheated steam is admitted to the engine by suitable valves, as in the use of ordinary steam. In this way the particles of water contained in that portion of the steam which passes through the pipes G are evaporated, and the whole superheated or surcharged with caloric, and the moment such superheated steam mingles with the saturated steam directly from the boiler all the particles of water in the latter are evaporated, and the whole becomes what is termed "dry-steam" of greater elastic force than if used as saturated steam; and, although we prefer to combine the superheated with the saturated steam in the steam-chest of the engine, as herein described, we do not wish to be understood as limiting our claim of invention thereto, as the same kind of result will be obtained by combining them before they reach the steam-chest or after passing into the engine, but we prefer to effect the combination within the steam-chest. The relative supply of superheated and saturated steam can be governed and controlled by suitable throttle or other valves in the pipes.

Instead of having the pipe which conducts the saturated steam and the pipe or pipes which conduct the superheated steam extend separately to the steam-chest or other receptacle, we have contemplated extending the saturated-steam pipe and superheated steam pipe or pipes separately to the cylinder, and we have also contemplated passing the superheated-steam pipe or pipes through the saturated-steam pipe, or carrying the saturated steam pipe through the superheated-steam pipe, so that the surplus heat of the superheated steamshall act upon the saturated steam before the mingling of the two takes place.

By carrying the superheating-pipes through the flue-space or a part of the flue-space or through the upper part of the furnace, the superheating of the steam is effected more economically than by any other known plan; and although we have herein stated, and in our drawing represented the superheating-pipes as passing down the smoke-stack and along the whole length of the flue and thence through the furnace, we wish it to be distinctly understood that this is only necessary to be done when it is desired to superheat the steam to a considerable temperature above the temperature at which the steam is generated. In most cases it will be found sufficient to have such pipes extend only through the flue-space and not through the fire-place, and although we prefer to superheat the steam in the flue-space or furnace of the boiler in which it was generated, we nevertheless wish it to be distinctly understood that the first part of our invention is not restricted to such mode of superheating the steam, as the first part of our invention may be used in connection with any mode of superheating.

What we claim as our invention, and desire to secure by Letters Patent, is—

1. Combining superheated steam with saturated steam for actuating steam-engines, substantially as specified.

2. In combination with the steam-chamber of a steam-boiler and the engine, two or more pipes, one for conveying the saturated steam and the other the superheated steam, as and for the purpose described.

CHAS. E. WETHERED.
JNO. WETHERED.
SAML. WETHERED.

Witnesses:
W. H. HAYWARD,
SAMUEL REESE.